May 17, 1960     W. GOULD     2,936,646
MECHANICAL ASSEMBLY
Filed Jan. 11, 1956

INVENTOR.
WILLIAM GOULD
BY *Albert Sperry*
ATTORNEY

United States Patent Office 2,936,646
Patented May 17, 1960

2,936,646

MECHANICAL ASSEMBLY

William Gould, Millburn, N.J., assignor to Keystone Plastics, Inc., Union, N.J., a corporation of New York Application January 11, 1956, Serial No. 558,549

1 Claim. (Cl. 74—459)

This invention relates to mechanism for converting rotary motion into longitudinal motion and is directed particularly to constructions presenting a minimum of frictional resistance to relative movement of the elements.

The conversion of rotary movement into longitudinal movement by means of screw mechanisms or threaded elements is quite usual. However, constructions of this character frequently present considerable friction. Moreover, the rigidity of the elements affords little or no freedom of play between the parts and as a result they tend to bind and increase the frictional resistance upon any misalignment, warping or displacement of one element with respect to another.

Typical installations wherein displacement of elements may occur and become most troublesome is in connection with window operators designed to raise or lower a sash upon rotation of a crank. The sash frames in installations of this type may warp or the building may settle somewhat, whereupon the elements are brought into misalignment or forceful engagement rendering relative movement thereof difficult if not impossible.

In accordance with the present invention these and other difficulties and objections to constructions of the prior art are overcome and means provided which insure easy operation and self adjusting movement of parts in converting rotary motion into longitudinal movement.

The advantages of the present invention are preferably attained by employing helical spring means as a screw member and by providing follower means including members engageable with the convolutions of the spring means. With this construction the yielding characteristics of the spring means are utilized to accommodate for misalignment or displacement of the elements. Moreover, the follower means are preferably so arranged and constructed as to afford additional freedom of movement and reduction of friction under varying conditions of operation.

One of the objects of the present invention is to provide a novel type of mechanism whereby rotary motion can be converted into longitudinal motion with a minimum of frictional resistance.

Another object of the invention is to provide helical spring means with cooperating follower means engageable with convolutions of the spring means in a manner to insure relative freedom of movement of the elements.

A specific object of the invention is to provide operating means, as for example a window operator, embodying helical spring means together with follower means capable of movement with respect to the spring means in a manner to accommodate for misalignment or displacement of one element with respect to another.

These and other objects and features of the present invention will appear from the following description thereof in which reference is made to the figures of the accompanying drawings.

Figure 1:
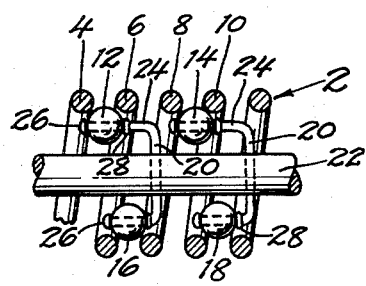
Fig. 1 is a longitudinal view partly in section illustrating elements embodying the present invention.

In that form of the invention chosen for purposes of illustration in Fig. 1, the device is provided with spring means indicated generally at 2 and embodying successive convolutions indicated at 4, 6, 8, and 10. The follower means shown consist of beads or rollers 12, 14, 16, and 18 which are rotatably mounted on supports 20 carried by a shaft 22. The supports 20 project outwardly from the shaft 22 and have roller carrying end portions 24 extending generally parallel to the shaft. The rollers are thus positioned in bearing engagement with the inner surfaces of the convolutions of the spring and are rotatable to afford a minimum of frictional resistance to relative movement of the spring and follower means.

As shown in Fig. 1, the bead or roller 12 engages both of the adjacent convolutions 4 and 6 of the spring 2 whereas the bead or roller 14 engages the two convolutions 8 and 10. The rollers 16 and 18 engage the same convolutions on the opposite side of the shaft 22 and are therefore displaced axially of the shaft with respect to rollers 12 and 14 by a distance equal to one half the pitch or spacing between the convolutions.

With this arrangement of the spring and follower means, the rollers are in firm engagement with the convolutions of the spring so that upon rotation of the spring, the beads will tend to follow along the convolutions of the spring in a direction axially of the shaft. At the same time, the rollers rotate about their supports 24 so that but very limited frictional resistance to rotation of the spring is presented. The spring therefore serves as a screw and the rollers move along the convolutions of the spring as on a thread.

In order to convert the rotation of the spring into longitudinal motion of the shaft 22, the rollers are confined on their supports 20 by means of retaining collars 26 and 28 on the end portions 24 of the roller supports. The end thrust of each roller as it follows the convolutions of the spring is exerted upon the retaining collars and supports and is thus applied to the shaft 22 so as to move the shaft axially of the spring. The direction and speed of movement of the shaft will of course depend upon the direction and speed of rotation of the spring 2.

Figure 2:
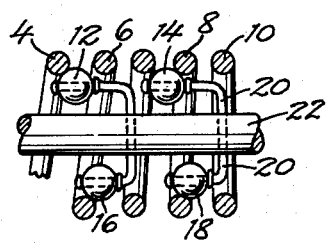
Fig. 2 is a view similar to Fig. 1 showing the elements in shifted positions.

The rollers or beads employed may be generally spherical, as shown in Fig. 1, whereby they may be displaced radially of the spring while remaining firmly in engagement therewith in the event the convolutions of the spring spread apart or are contracted axially due to the application of more or less force to the spring. Moreover, upon resistance to rotation of the spring, its convolutions not only tend to expand axially but also tend to vary in diameter. Spherical rollers or beads as shown, present rounded surfaces capable of moving into and out of the space between the convolutions of the spring and therefore remain firmly in engagement therewith in all the varied positions and spacings of the convolutions and even when the spring is distorted or bodily shifted as shown in Fig. 2.

The rollers, of course, may be made of any suitable or preferred material but it is found in practice that rollers formed of nylon, in particular presents a minimum of friction and requires no lubrication when used in engagement with metal of which the spring means is formed.

The construction described serves to convert rotary motion into longitudinal motion while avoiding binding and undue frictional resistance upon displacement, misalignment or distortion of the elements. Either the spring means or the shaft may be rotated whereupon the other element of the combination will be moved longitudinally. Moreover, since relative rotation is all that is required for operation, the assembly may be used to respond to difference in the speed of rotation of the spring means and the shaft.

Assemblies of the character described have a multitude of uses and may be employed in any location wherein rotary motion is to be converted into longitudinal motion.

Figure 3:
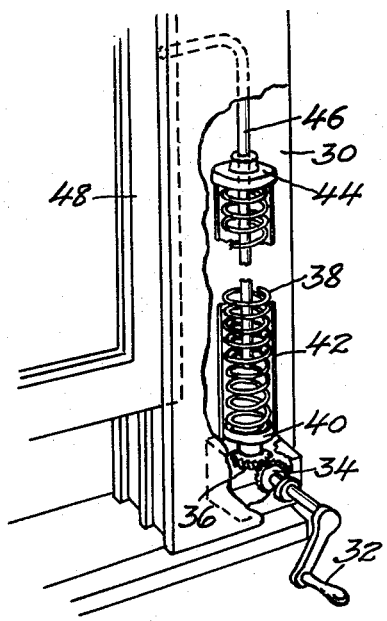
Fig. 3 is a diagrammatic illustration of a portion of a window and operating mechanism embodying the present invention.
Figure 4:
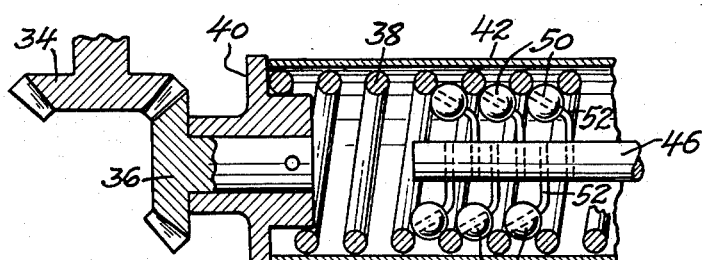
Fig. 4 is an enlarged view of a detail of the construction shown in Fig. 2.

A typical application of the invention, and one for which it is particularly suited, is illustrated in Figs. 3 and 4 where it is employed in a window operator. As shown, the operating means is housed within the stile 30 of a window frame and includes an operating crank 32 by which bevel gears 34 and 36 are rotated to rotate the spring 38. The spring 38 is secured to a collar 40 on the bevel gear 36 and may be housed within a tubular sleeve 42 carried by the collar for confining the spring and limiting lateral displacement thereof. The outer end of the sleeve 42 may further be provided with a cover 44 with a central opening therein serving as a bearing for the vertically movable shaft 46 by which the window sash 48 is raised and lowered.

The shaft 46 is provided on its lower end with follower means consisting of the rollers 50 mounted on inclined supports 52 secured to the shaft. The rollers engage the inner sides of the convolutions of the spring 38 in a manner to travel along the convolutions as though engaging a conventional thread.

With this construction, rotation of the operating crank 32 causes the spring means 38 to rotate so as to raise or lower the window as desired. The action is positive and effective. However, if the window should stick or resist opening, the spring means permits considerable force to be exerted upon the elements without danger of breaking or shearing any part. Moreover, the force is stored by the spring so as to afford a cumulative force for overcoming any sticking or resistance. Nevertheless, when the force is released, the window sash will not be slammed open or shut, but will be moved smoothly by the screw effect of the spring and follower means.

The arrangement of the supports 52 for rollers 50 in an inclined position with respect to shaft 46, as shown in Fig. 4, serves to transmit longitudinal motion to the shaft without the need for retaining collars on the supports. However, such retainers may be used if desired.

Figure 5:
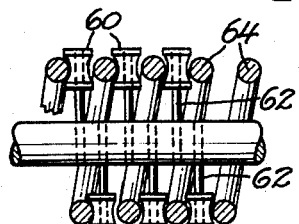
Fig. 5 is a longitudinal sectional view through a portion of an alternative embodiment of the invention.

In the construction illustrated in Fig. 5, rollers 60 are mounted on radially extending supports 62 and are shaped to engage and partially embrace the convolutions of the spring 64. In the construction, the rollers are of less diameter than the space between the convolutions and a limited amount of lost motion is provided upon rotating the spring, or shaft, in opposite directions. The rollers are nevertheless movable radially to allow for misalignment of the spring and shaft and yet insure freedom of movement of the elements.

The various constructions shown and described may each be used in any location or mechanism wherein it is desired to convert rotary motion into longitudinal motion. Furthermore, the form of the rollers or beads of the follower means, the diameter and pitch of the convolutions of the spring means, and the shape of the convolutions in cross section may be varied as desired for any particular installation. It is also possible to vary the type of mounting or support for the rollers and the arrangement of the shaft, sleeve or other portion of the follower means by which the rollers are carried.

In view thereof, it will be evident that numerous changes and variations may be made in the form, construction, and arrangement of the elements of the assembly. For these reasons, it should be understood that the particular embodiments of the invention shown in the drawing and described above are intended to be illustrative only and are not intended to limit the scope of the invention.

I claim:

Means for converting rotary motion into longitudinal motion comprising spring means having spaced convolutions, a shaft extending axially of the spring means, roller supports projecting outwardly from said shaft, rollers rotatably mounted on said roller supports and engaging the inner surfaces of said convolutions for moving the shaft longitudinally upon rotation of said spring means, a sleeve surrounding said spring means and a cover for the end of said sleeve having an opening therein through which said shaft extends.

References Cited in the file of this patent

UNITED STATES PATENTS

| | | |
|---|---|---|
| 728,949 | Mason | May 26, 1903 |
| 1,474,010 | Abell | Nov. 13, 1923 |
| 1,840,547 | Vinghereets | Jan. 12, 1932 |
| 2,609,256 | Baker et al. | Sept. 2, 1952 |
| 2,636,727 | Toth | Apr. 28, 1953 |
| 2,682,176 | Fagley | June 29, 1954 |

OTHER REFERENCES

Publications:
Electronics Magazine, March 1952.
Product Engineering, February 1952.
Product Engineering Annual Handbook, 1953.